US010313132B2

(12) United States Patent
Lee et al.

(10) Patent No.: US 10,313,132 B2
(45) Date of Patent: Jun. 4, 2019

(54) METHOD AND SYSTEM FOR IMPORTING AND EXPORTING CONFIGURATIONS

(71) Applicant: Getac Technology Corporation, Hsinchu County (TW)

(72) Inventors: Jiunn-Jye Lee, Taipei (TW); Yu-Shian Chen, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 112 days.

(21) Appl. No.: 15/454,365

(22) Filed: Mar. 9, 2017

(65) Prior Publication Data

US 2018/0262340 A1    Sep. 13, 2018

(51) Int. Cl.
*H04L 29/06* (2006.01)
*H04L 9/32* (2006.01)

(52) U.S. Cl.
CPC ........ *H04L 9/3247* (2013.01); *H04L 63/0428* (2013.01); *H04L 63/0823* (2013.01); *H04L 63/126* (2013.01)

(58) Field of Classification Search
CPC ...... H04L 9/3247; H04L 9/30; H04L 63/0428
See application file for complete search history.

(56) References Cited

U.S. PATENT DOCUMENTS

2001/0050990 A1  12/2001  Sudia

2004/0260928 A1*  12/2004  Immonen ............ H04L 63/0823
                                                            713/175
2011/0161659 A1*   6/2011  Himawan .............. G06F 21/33
                                                            713/156

FOREIGN PATENT DOCUMENTS

WO    2013177069 A1   11/2013
WO    2016038331 A1    3/2016

OTHER PUBLICATIONS

European Patent Office, Office Action, dated Jul. 24, 2018, Germany.
Deutsches Patent Office, Office Action, dated Jan. 24, 2018, Munchen.

* cited by examiner

*Primary Examiner* — Evans Desrosiers
(74) *Attorney, Agent, or Firm* — Locke Lord LLP; Tim Tingkang Xia, Esq.

(57) ABSTRACT

A method for importing and exporting configurations includes: generating a public key and a private key of a manufacturer; generating a certificate of the manufacturer; storing the certificate of the manufacturer in each of products; and signing a public key by using the private key of the manufacturer to generate a signature of the manufacturer; wherein the products receive the certificate of the manufacturer, at least one configuration and a signature of a customer which is generated by signing the at least one configuration by using a private key of the customer, as well as each products verifies the signature of the manufacturer in accordance with the stored certificate of the manufacturer, verifies the signature of the customer in accordance with the certificate of the manufacturer, and applies the at least one configuration when authenticated. A system for importing and exporting configurations is also provided.

10 Claims, 5 Drawing Sheets

METHOD AND SYSTEM FOR IMPORTING AND EXPORTING CONFIGURATIONS

BACKGROUND OF THE INVENTION

Field of the Invention

The present invention relates to verification methods and systems and, more particularly, to a method and system for importing and exporting device parameters.

Description of the Prior Art

New electronic devices nowadays must be set up in order to start operating. The setup is carried out to the electronic devices by either a manufacturer before delivery or a user with user-defined settings. The setup process usually requires selecting options displayed on a series of setup screens and thus setting up the electronic devices one by one. As a result, the setup process takes much time to set up a large number of electronic devices.

SUMMARY OF THE INVENTION

An embodiment of the present invention provides a method for importing and exporting device parameters, comprising: generating a manufacturer public key and a manufacturer private key of a manufacturer; generating a manufacturer certificate according to the manufacturer public key; storing the manufacturer certificate in a plurality of commodities; signing a client public key according to the manufacturer private key to generate a manufacturer signature; receiving by the plurality of commodities the manufacturer signature, at least one setup parameter, and a client signature generated by signing the at least one setup parameter according to a client private key; verifying the manufacturer signature by each said commodity according to the stored manufacturer certificate; verifying the client signature by the commodities which have passed the verification according to the manufacturer signature; and applying the at least one setup parameter to the commodities which have passed the verification.

An embodiment of the present invention provides a system for importing and exporting device parameters, comprising a manufacturer server and a plurality of commodities. The manufacturer server generates a manufacturer public key and a manufacturer private key. The plurality of commodities each stores therein a manufacturer certificate generated according to the manufacturer public key. The manufacturer server receives a client public key and signs the client public key according to the manufacturer private key so as to generate a manufacturer signature, and the plurality of commodities receives the manufacturer signature, the at least one setup parameter, and a client signature generated by signing the at least one setup parameter according to a client private key. Each commodity verifies the manufacturer signature according to the manufacturer certificate stored in the commodity. The commodities which have passed the verification verify the client signature according to the manufacturer signature. The at least one setup parameter is applied to the commodities which have passed the verification.

An embodiment of the present invention provides a system for importing and exporting device parameters, adapted to verify a plurality of commodities, comprising a manufacturer server and a computer program product. The manufacturer server comprises a storing unit, a communication unit, and a signature unit. The storing unit stores therein a manufacturer public key and a manufacturer private key. The communication unit receives a client public key from a setup host. The signature unit signs the client public key according to the manufacturer private key to generate a manufacturer signature and sends the manufacturer signature to the setup host through the communication unit. The computer program product is executed by the setup host and comprises a communication module, a setup module, and a signature module. The communication module sends the client public key to the manufacturer server through a communication interface and receives the manufacturer signature. The setup module receives at least one setup parameter through an input interface. The signature module signs the at least one setup parameter according to the client private key to generate a client signature and sends the at least one setup parameter, the client signature, and the manufacturer signature to the plurality of commodities through the communication module, respectively, so as for the at least one setup parameter to be applied to the commodities upon an affirmative verification of the manufacturer signature and an affirmative verification of the client signature.

In conclusion, the method and system for importing and exporting device parameters, as provided by embodiments of the present invention, simplify the process of setting up commodities and enhance the security of data being transmitted.

DETAILED DESCRIPTION OF THE EMBODIMENTS

Figure 1:
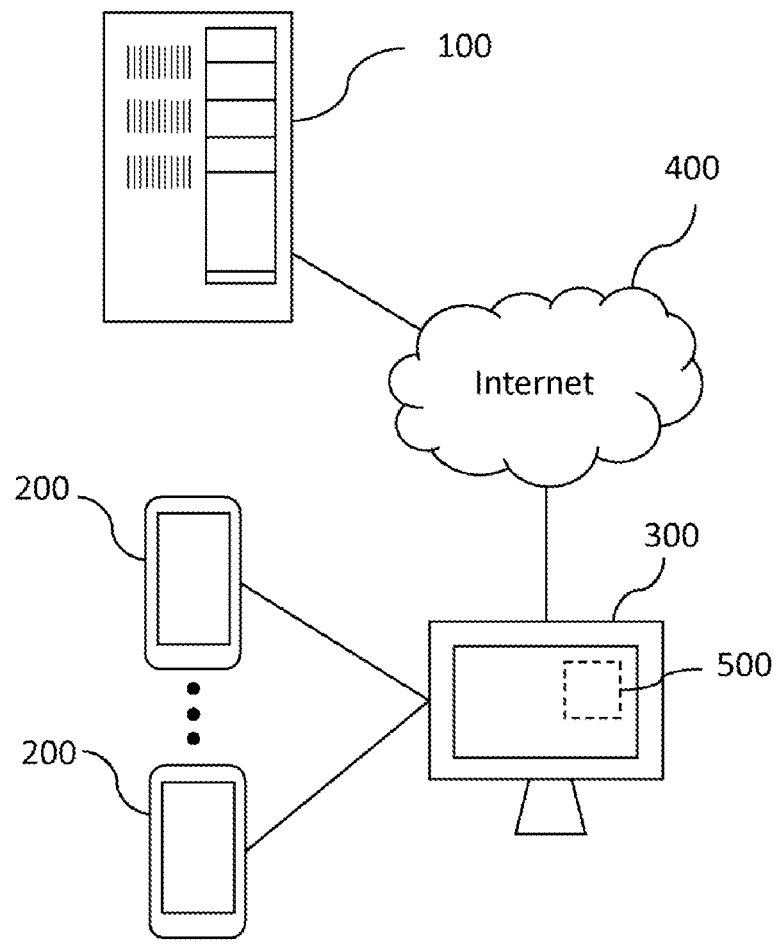
FIG. 1 is a schematic view of the framework of a system for importing and exporting device parameters according to an embodiment of the present invention.

Referring to FIG. 1, a system for importing and exporting device parameters according to an embodiment of the present invention is used to verify a plurality of commodities 200 manufactured by a manufacturer. The commodities 200 are exemplified by cell phones, but embodiments of the present invention are not limited thereto. A variant embodiment of the present invention is exemplified by any other electronic products, such as notebook computers, tablets, and navigators. The verification system comprises a manufacturer server 100 and a computer program product 500.

Figure 2:
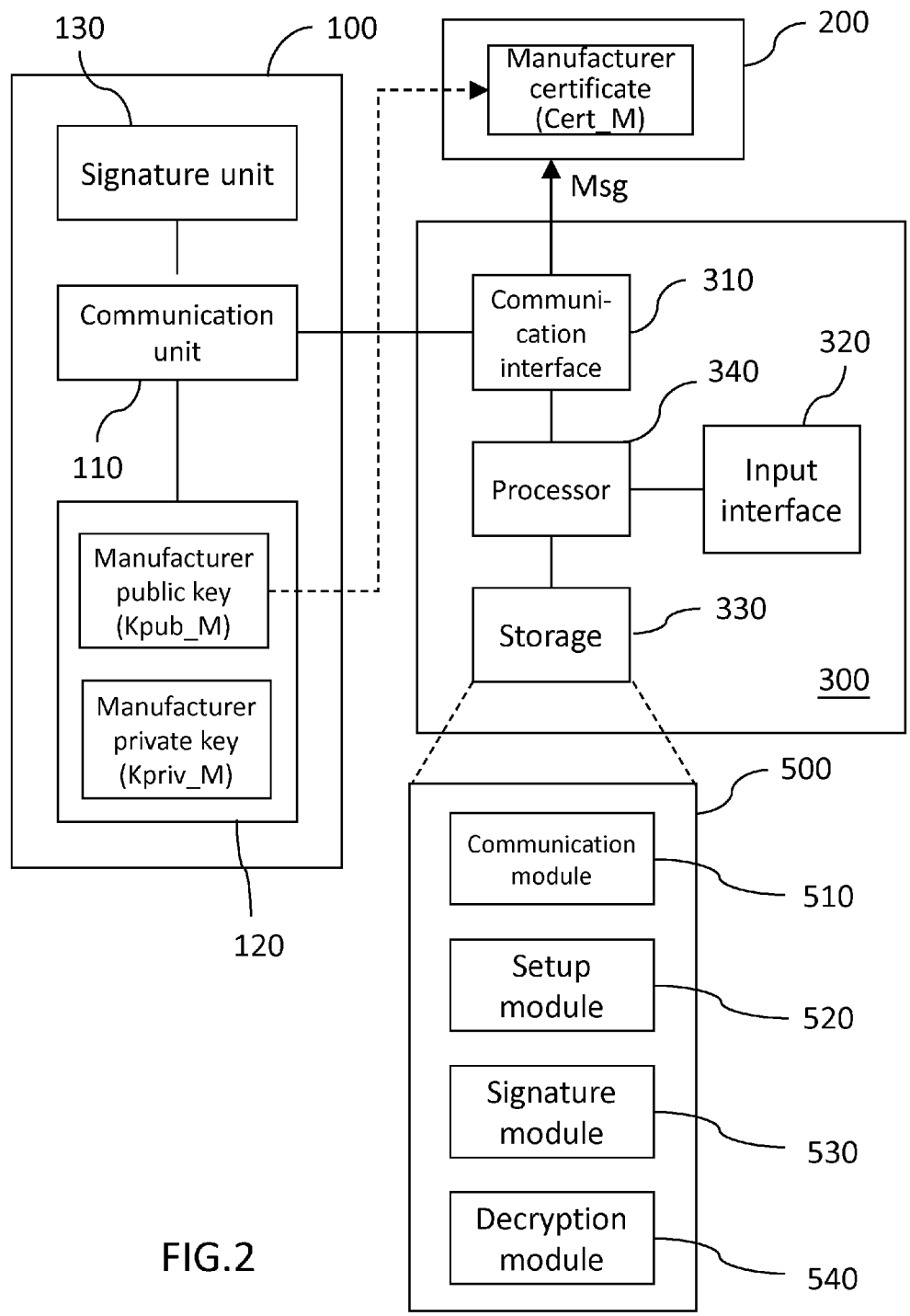
FIG. 2 is a block diagram of the system for importing and exporting device parameters according to an embodiment of the present invention.

The computer program product 500 is installed on a setup host 300 of a client and executed by the setup host 300. The setup host 300 is a computer device, such as a personal computer, an industrial computer, an embedded host, a tablet, and a smartphone, and comprises a communication interface 310, an input interface 320, a storage 330, and a processor 340. The processor 340 coordinates the operation of peripheral components, such as the communication interface 310, the input interface 320, and the storage 330 as shown in FIG. 2. Depending on the type of the setup host 300, the input interface 320 comprises one or more interfaces, such as a mouse, a keyboard, a touchscreen, a trackball, a button, and a joystick. The communication interface 310 comprises one or more interfaces, such as ethernet, a wireless network, a Bluetooth-enabled interface, an infrared-enabled interface, and an interface compatible with near-field communication, to thereby communicate with the manufacturer server 100 and the commodities 200, respectively. In an embodiment, the communication interface 310 is not restricted to using an electrical signal as a transmission medium, but may convert any signal, which is intended to be transmitted, into an image, a sound, or any other medium, for transmission. For instance, the setup host 300 converts a data, which is intended to be transmitted, into 1D barcode or 2D barcode which is then captured by a signal receiving end (i.e., the commodities 200) through photographic lenses. The captured 1D barcode or 2D barcode is decoded to access the data carried therein.

The setup host 300 is connected to the manufacturer server 100 by the Internet 400; hence, the communication interface 310 of the setup host 300 can be connected to the Internet 400, but embodiments of the present invention are not limited thereto. In some embodiments, the setup host 300 is connected to the manufacturer server 100 by a long-range wireless technology called LoRa. If both the setup host 300 and the manufacturer server 100 are located at the same place, they can be connected by a local area network (LAN).

Figure 4:
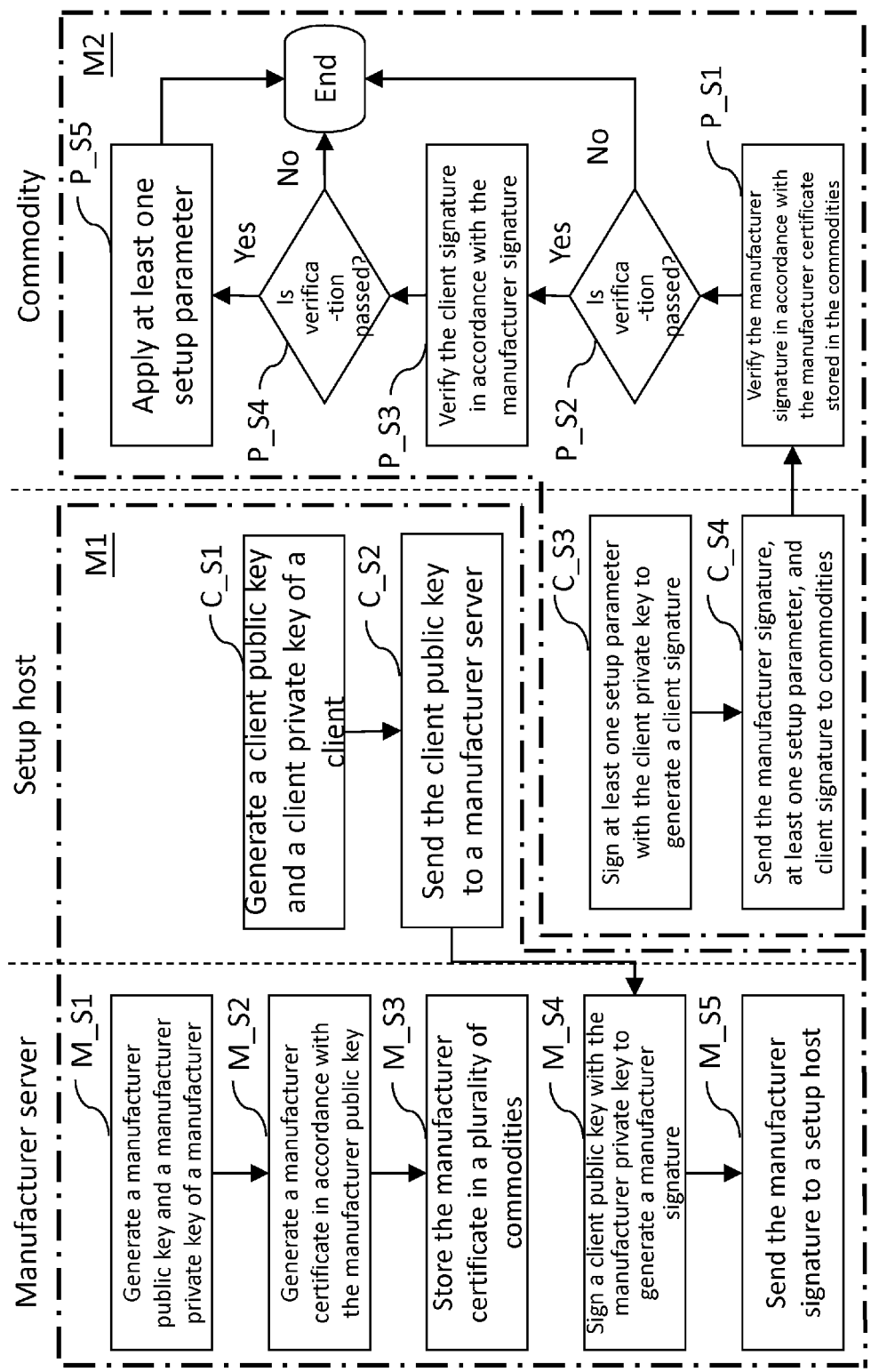
FIG. 4 is a flowchart (1) of a method for importing and exporting device parameters according to an embodiment of the present invention.
Figure 5:
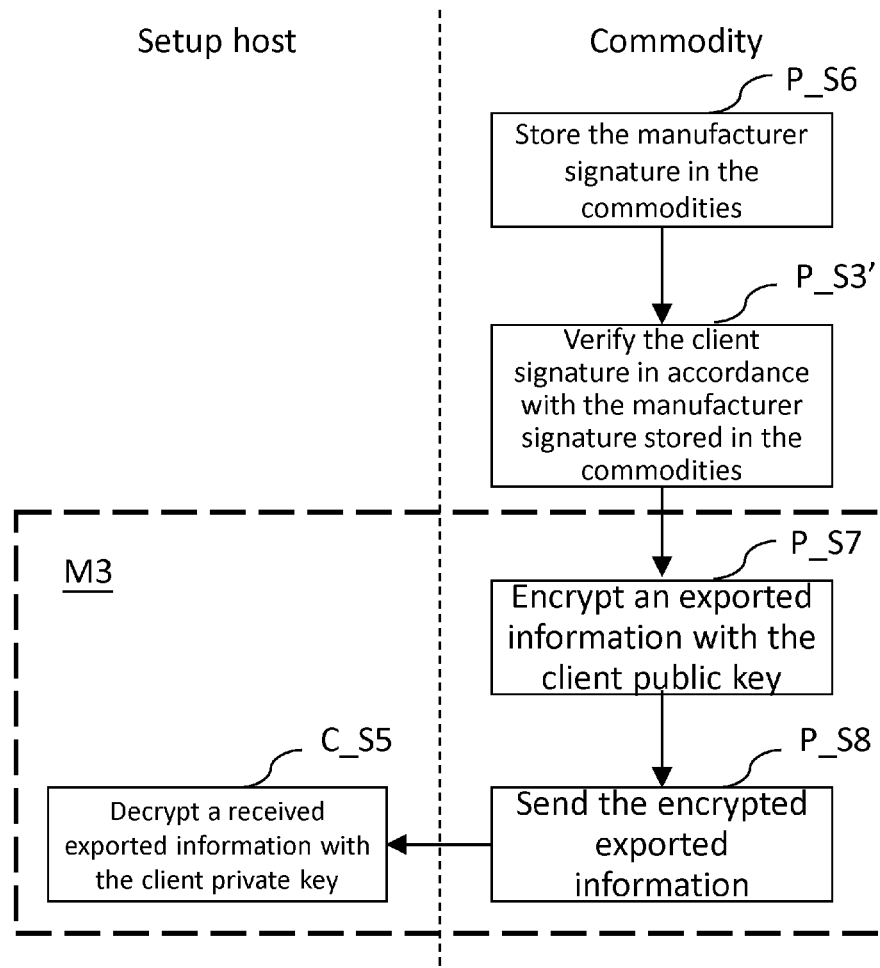
FIG. 5 is a flowchart (2) of the method for importing and exporting device parameters according to an embodiment of the present invention.

The storage 330 includes one or more storage devices, for example, a built-in storage medium (such as a non-volatile memory and a hard disk drive), and an external storage medium (such as a memory card and a USB flash drive). Referring to FIG. 2, the computer program product 500 is stored in the storage 330 and executed by the processor 340. The computer program product 500 comprises a communication module 510, a setup module 520, a signature module 530, and a decryption module 540. The aforesaid modules are each provided in the form of a program segment for performing a specific function and more suitable than a program for describing the process of the execution of a software in the setup host 300. The functions of the communication module 510, setup module 520, signature module 530, and decryption module 540 are depicted by FIG. 4 and FIG. 5.

Referring to FIG. 2, the manufacturer server 100 comprises a communication unit 110, a storing unit 120, and a signature unit 130. The storing unit 120 stores therein manufacturer public key Kpub_M and manufacturer private key Kpriv_M of a manufacturer. The storing unit 120 is a storage medium, such as a hard disk drive and a drive array. The communication unit 110 and the communication interface 310 of the setup host 300 operate jointly and thus support communication technologies, such as ethernet, wireless networks, mobile networks, satellite networks, and LoRa. The signature unit 130 is provided in the form of a program segment for performing a signature function. Understandably, the manufacturer server 100 further has the other components, such as a processor, and is not described in detail herein.

The method for importing and exporting device parameters according to an embodiment of the present invention is carried out in three processes. FIG. 4 depicts a first process M1 and a second process M2. FIG. 5 depicts a third process M3.

The first process M1 is a preparatory process. First, the manufacturer server 100 uses an asymmetric encryption algorithm (such as RSA algorithm) to generate manufacturer public key Kpub_M and manufacturer private key Kpriv_M (step M_S1) of a manufacturer. Then, in step M_S2, the manufacturer server 100 generates manufacturer certificate Cert_M according to the manufacturer public key Kpub_M. Afterward, in step M_S3, the manufacturer server 100 stores manufacturer certificate Cert_M in each of the commodities 200. By the time when a client purchases the commodities 200, all the commodities 200 have stored manufacturer certificate Cert_M.

After purchasing the commodities 200, the client installs the aforesaid computer program product 500 on the setup host 300. Likewise, the computer program product 500 is provided by the manufacturer and located at a storage medium, such as a magnetic disk, an optical disk, and a USB flash drive, in the package of each commodity 200. Alternatively, the computer program product 500 is accessible in a network space, such as a Website and an online shopping site, and downloadable by the client.

After the computer program product 500 has been installed, the setup host 300 receives the client's operating commands and data through the input interface 320, and the setup module 520 uses an asymmetric encryption algorithm to generate client public key Kpub_C and client private key Kpriv_C of the client (step C_S1). Both client public key Kpub_C and client private key Kpriv_C are stored in the storage 330. Then, in step C_S2, the communication module 510 sends client public key Kpub_C to the manufacturer server 100 through the communication interface 310. Afterward, in step M_S4, the communication unit 110 of the manufacturer server 100 receives client public key Kpub_C from the setup host 300, and the signature unit 130 of the manufacturer server 100 signs the received client public key Kpub_C according to manufacturer private key Kpriv_M so as to generate a manufacturer signature Sig_M. In step M_S5, the communication unit 110 sends manufacturer signature Sig_M to the setup host 300. At this point in time, the preparatory process is done.

The second process is a parameter import (setup) process for performing parameter setup on the commodities 200. The setup module 520 provides an operating screen for the client to operate. The operating screen provides one or more setup options for the client to select. After the client has selected a setup option, the setup module 520 generates at least one setup parameter Cmd. In step C_S3, the signature module 530 signs, according to client private key Kpriv_C, at least one setup parameter Cmd received through the input interface 320, so as to generate client signature Sig_C. In an embodiment, setup parameter Cmd is adapted for use in wireless network connection setup and comprises a password and a service setting identity (SSID) of a wireless network.

Figure 3:
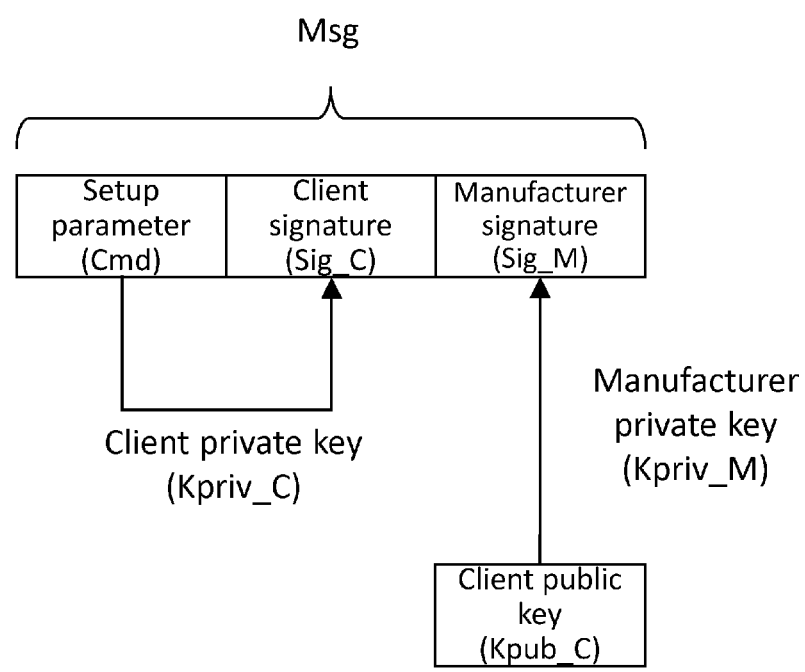
FIG. 3 is a schematic view of the composition of a setup message according to an embodiment of the present invention.

Referring to FIG. 3 and FIG. 4, in step C_S4, the signature module 530 sends through the communication module 510 setup message Msg to the commodities 200 which require setup. Setup message Msg comprises the at least one setup parameter Cmd, client signature Sig_C, and manufacturer signature Sig_M. As shown in FIG. 3, client signature Sig_C is generated by signing setup parameter Cmd according to client private key Kpriv_C, and manufacturer signature Sig_M is generated by signing client public key Kpub_C according to manufacturer private key Kpriv_M.

Referring to FIG. 4, after the commodities 200 has received setup message Msg, step P_S1 begins. Step P_S1 involves verifying manufacturer signature Sig_M according to manufacturer certificate Cert_M stored in the commodities 200. Manufacturer certificate Cert_M is generated according to the manufacturer public key KPub_M, and manufacturer signature Sig_M is signed according to manufacturer private key Kpriv_M; hence, it is feasible to verify the legality of manufacturer signature Sig_M in setup message Msg according to whether manufacturer certificate Cert_M matches manufacturer signature Sig_M. When the verification is affirmative, step P_S3 begins. When the verification is negative, the setup host 300 displays an error message to thereby end the process flow (step P_S2). Step P_S1 confirms whether setup message Msg conforms with the commodities 200 of the correct manufacturer.

The commodities 200 satisfactorily verified in step P_S1 verify client signature Sig_C in setup message Msg according to manufacturer signature Sig_M in step P_S2. The manufacturer signature Sig_M is signed according to client public key Kpub_C, and client signature Sig_C is signed according to client private key Kpriv_C; hence, it is feasible to verify the legality of client signature Sig_C in setup message Msg according to whether they match. When the verification is affirmative, step P_S5 begins. When the verification is negative, the setup host 300 displays an error message to thereby end the process flow (step P_S4). Step P_S3 confirms whether setup message Msg is generated by a client authorized by the manufacturer (or a client in possession of a product produced by the manufacturer), so as to verify the client's identity.

Finally, in step P_S5, setup parameter Cmd in setup message Msg is applied to the commodities 200 verified in the aforesaid step P_S1 and step P_S3, so as to finalize the setup of the commodities 200.

Referring to FIG. 5, in an embodiment, step P_S5 is followed by step P_S6 and step P_S3'. In step P_S6, the commodities 200 store manufacturer signature Sig_M which have passed verification. Then, to perform setup on the commodities 200 again, the aforesaid step P_S3 is replaced by step P_S3'. Hence, if the commodities 200 store manufacturer signature Sig_M which has passed verification, the commodities 200 will no longer verify client signature Sig_C according to manufacturer signature Sig_M in setup message Msg, but will verify client signature Sig_C according to manufacturer signature Sig_M stored in the commodities 200. Hence, every instance of setup must be carried out by a client who has never carried out a setup before, so as to prevent different legal clients from setting up each other's commodities 200, thereby reducing the chance that data will be divulged or settings will be changed by an unauthorized person.

Referring to FIG. 5, the third process relates to device parameter export and comprises step P_S7, step P_S8, and step C_S5. In step P_S7, one or more commodities 200 encrypt an exported information according to client public key. In this regard, client public key Kpub_C for use in encrypting an exported information originates from manufacturer signature Sig_M stored in the commodities 200. Then, step P_S8 entails sending the encrypted exported information to the setup host 300. Finally, in step C_S5, the decryption module 540 of the setup host 300 decrypts the received exported information according to client private key Kpriv_C. The commodities 200 sends information to the setup host 300 by the aforesaid security protection means.

Although the setup host 300 is disposed at the client end in the preceding embodiment, the setup host 300 is disposed at the manufacturer end in some embodiments.

In conclusion, the method and system for importing and exporting device parameters, as provided by embodiments of the present invention, simplify the process of setting up the commodities 200 and enhance the security of data being transmitted.

What is claimed is:

1. A method for importing and exporting device parameters, comprising:
    generating a manufacturer public key and a manufacturer private key of a manufacturer;
    generating a manufacturer certificate according to the manufacturer public key;
    storing the manufacturer certificate in a plurality of commodities;
    signing a client public key according to the manufacturer private key to generate a manufacturer signature;
    receiving by the plurality of commodities the manufacturer signature, at least one setup parameter, and a client signature generated by signing the at least one setup parameter according to a client private key;
    verifying the manufacturer signature by each said commodity according to the stored manufacturer certificate;
    verifying the client signature by the commodities which have passed the verification according to the manufacturer signature; and
    applying the at least one setup parameter to the commodities which have passed the verification.

2. The method for importing and exporting device parameters according to claim 1, further comprising:
    storing the manufacturer signature in the plurality of commodities,
    wherein the step of verifying the client signature by the commodities which have passed the verification according to the manufacturer signature entails verifying the client signature according to the manufacturer signature stored in the commodities.

3. The method for importing and exporting device parameters according to claim 1, further comprising:
    encrypting an exported information according to the client public key by one of the commodities;
    sending the encrypted exported information; and
    decrypting the received exported information according to the client private key.

4. The method for importing and exporting device parameters according to claim 3, wherein the client public key for use in encrypting the exported information originates from the manufacturer signature stored in the commodities.

5. A system for importing and exporting device parameters, comprising:
    a manufacturer server for generating a manufacturer public key and a manufacturer private key; and
    a plurality of commodities each storing a manufacturer certificate generated according to the manufacturer public key,
    wherein the manufacturer server receives a client public key and signs the client public key according to the manufacturer private key so as to generate a manufacturer signature, and the plurality of commodities receives the manufacturer signature, the at least one setup parameter, and a client signature generated by signing the at least one setup parameter according to a client private key;
    wherein each said commodity verifies the manufacturer signature according to the manufacturer certificate stored in the commodity, the commodities which have passed the verification verify the client signature according to the manufacturer signature, and the at least one setup parameter is applied to the commodities which have passed the verification.

6. The system for importing and exporting device parameters according to claim 5, wherein the commodities store therein the manufacturer signatures, respectively, for verifying the client signature.

7. The system for importing and exporting device parameters according to claim 5, wherein one of the commodities encrypts an exported information according to the client public key and sends the encrypted exported information to a setup host such that the setup host decrypts the received exported information according to the client private key.

8. The system for importing and exporting device parameters according to claim 7, wherein the client public key whereby the commodities encrypt the exported information originates from the manufacturer signature stored in the commodities.

9. A system for importing and exporting device parameters, adapted to verify a plurality of commodities, comprising:
    a manufacturer server, comprising:
        a storing unit for storing a manufacturer public key and a manufacturer private key;
        a communication unit for receiving a client public key from a setup host; and
        a signature unit for signing the client public key according to the manufacturer private key to generate a manufacturer signature and sending the manufacturer signature to the setup host through the communication unit; and
    a computer program product executed by the setup host, comprising:
        a communication module for sending the client public key to the manufacturer server through a communication interface and receiving the manufacturer signature;
        a setup module for receiving at least one setup parameter through an input interface; and
        a signature module for signing the at least one setup parameter according to the client private key to generate a client signature and sending the at least one setup parameter, the client signature, and the manufacturer signature to the plurality of commodities through the communication module, respectively, so as for the at least one setup parameter to be applied to the commodities upon an affirmative verification of the manufacturer signature and an affirmative verification of the client signature.

10. The system for importing and exporting device parameters according to claim 9, wherein the communication module receives through the communication interface an exported information encrypted according to the client public key by one of the commodities, and the computer program product further comprises a decryption module for decrypting the received exported information according to the client private key.

* * * * *